(12) United States Patent
Sugiyama

(10) Patent No.: US 7,992,675 B2
(45) Date of Patent: Aug. 9, 2011

(54) VEHICLE EXHAUST DEVICE

(75) Inventor: Daisuke Sugiyama, Hamamatsu (JP)

(73) Assignee: Suzuki Motor Corporation, Hamamatsu-shi, Shizuoka-ken (JP)

( * ) Notice: Subject to any disclaimer, the term of this patent is extended or adjusted under 35 U.S.C. 154(b) by 0 days.

(21) Appl. No.: 12/459,809

(22) Filed: Jul. 8, 2009

(65) Prior Publication Data
US 2010/0006369 A1 Jan. 14, 2010

(30) Foreign Application Priority Data
Jul. 9, 2008 (JP) ................................. 2008-179034

(51) Int. Cl.
*F01N 13/08* (2010.01)
*F01N 13/20* (2010.01)
(52) U.S. Cl. ........................................ 181/228; 180/296
(58) Field of Classification Search ............. 296/187.11, 296/193.08; 181/227, 228, 238, 239; 180/309, 180/29.2, 296; 293/102, 113
See application file for complete search history.

(56) References Cited

U.S. PATENT DOCUMENTS

| | | | | | |
|---|---|---|---|---|---|
| 2,568,409 | A | * | 9/1951 | Phillips | 293/113 |
| 2,841,232 | A | * | 7/1958 | Loeffler | 180/89.2 |
| 2,854,278 | A | * | 9/1958 | Zerhan, Jr. | 293/113 |
| 2,856,020 | A | * | 10/1958 | Hoagg et al. | 180/309 |
| 2,902,102 | A | * | 9/1959 | Gorman et al. | 180/309 |
| 2,965,404 | A | * | 12/1960 | Pittsley et al. | 293/113 |
| 2,979,357 | A | * | 4/1961 | Leach et al. | 293/113 |
| 2,992,035 | A | * | 7/1961 | Tell et al. | 293/113 |
| 5,321,214 | A | * | 6/1994 | Uegane et al. | 181/211 |
| 6,938,729 | B2 | * | 9/2005 | Worner et al. | 181/254 |
| 6,962,230 | B2 | * | 11/2005 | Hanaya et al. | 180/309 |
| 2001/0047897 | A1 | * | 12/2001 | Steenackers et al. | 180/89.2 |
| 2005/0247516 | A1 | * | 11/2005 | Uegane | 181/228 |
| 2008/0036222 | A1 | * | 2/2008 | Iwamoto et al. | 293/113 |
| 2008/0093160 | A1 | * | 4/2008 | Fritz | 181/227 |

FOREIGN PATENT DOCUMENTS

| | | |
|---|---|---|
| JP | 2007-091129 | 4/2007 |
| JP | 2007090914 A * | 4/2007 |
| JP | 2007099090 A * | 4/2007 |

OTHER PUBLICATIONS

Translation of JP 2007-091129 A, JPO website, accessed Dec. 29, 2010.*

* cited by examiner

*Primary Examiner* — Jeremy Luks
(74) *Attorney, Agent, or Firm* — Flynn, Thiel, Boutell & Tanis, P.C.

(57) ABSTRACT

In a vehicle exhaust device, rear wheels are disposed outside of rear side members extending in a vehicle front-rear direction. Opening portions are formed at side portions, in the vehicle width-direction, of a rear bumper. Diffusers extending into the rear bumper are mounted in the opening portions. Mufflers are disposed at a rear portion of the vehicle with axes of the mufflers extending in the vehicle front-rear direction, and tail pipes connected to rear end faces of the mufflers are inserted into the diffusers while spaced from inner peripheries of the diffusers. The mufflers are disposed on rear sides of the rear wheels in the vehicle front-rear direction with outer peripheral faces of the mufflers protruding outside the rear side members in the vehicle-width direction, and with the rear end faces of the mufflers facing front end opening portions of the diffusers.

4 Claims, 3 Drawing Sheets

U.S. 7,992,675 B2

VEHICLE EXHAUST DEVICE

The present invention relates to a vehicle exhaust device, and particularly to a vehicle exhaust device in which tail pipes are inserted into diffusers integrated with a rear bumper to prevent dirt from entering the diffusers and to improve external appearance quality of a vehicle.

BACKGROUND OF THE INVENTION

In order to improve external appearance quality of a vehicle, and especially a rear portion of the vehicle, Japan Patent Application Laid-Open No. 2007-91129 discloses a rear bumper integrally formed with cylindrical diffusers extending into the rear bumper and tail pipes of mufflers that open into the diffusers.

In some conventional vehicle exhaust devices, front end portions of the diffusers are bent down with respect to the vehicle and tail pipes are inserted into the bent portions so that the ground and parts, such as suspensions, cannot be seen from front end opening portions of the diffusers.

With the above structure, however, dirt splashed by rear wheels enters the diffusers, which reduces external appearance quality of the vehicle and, in some instances, limits the function of the diffusers.

An object of the invention, in a vehicle exhaust device in which tail pipes are inserted into diffusers integrated with a rear bumper, is to prevent dirt from entering the diffusers, improve external appearance quality of a vehicle, and maintain the function of the diffusers.

According to the present invention, there is provided a vehicle exhaust device in which rear wheels are disposed outside, in a vehicle width direction, rear side members extending in a vehicle front-rear direction, a rear bumper is disposed behind the rear wheels, an opening portion is formed at a side portion of the rear bumper in the vehicle width direction, a cylindrical diffuser extending into the rear bumper is mounted in the opening portion, a muffler is disposed at a rear portion of a vehicle with an axis of the muffler extending in the vehicle front-rear direction, and a tail pipe connected to a rear end face of the muffler is inserted into the diffuser while spaced from an inner periphery of the diffuser. The muffler is disposed on a rear side of the rear wheels in the vehicle front-rear direction with an outer peripheral face of the muffler protruding outside the rear side member in the vehicle-width direction, and the rear end face of the muffler faces a front end opening portion of the diffuser.

As described above, the muffler is disposed on the rear side of the rear wheels in the vehicle front-rear direction with the outer peripheral face of the muffler protruding outside the rear side member in the vehicle-width direction. Therefore it is possible to have dirt splashed by the rear wheel hit against the outer peripheral face of the muffler and fall, to prevent the dirt from entering the diffuser.

Moreover, the rear end face of the muffler protruding outside the rear side member in the vehicle width direction faces the front end opening portion of the diffuser. Therefore, it is possible to make the rear wheel and parts around it invisible from a space between the front end opening portion of the diffuser and the rear end face of the muffler when the vehicle is seen from behind to thereby improve the external appearance quality of the vehicle.

DETAILED DESCRIPTION OF THE INVENTION

Embodiments of the present invention will be described below in detail based on the drawings.

Figure 1:
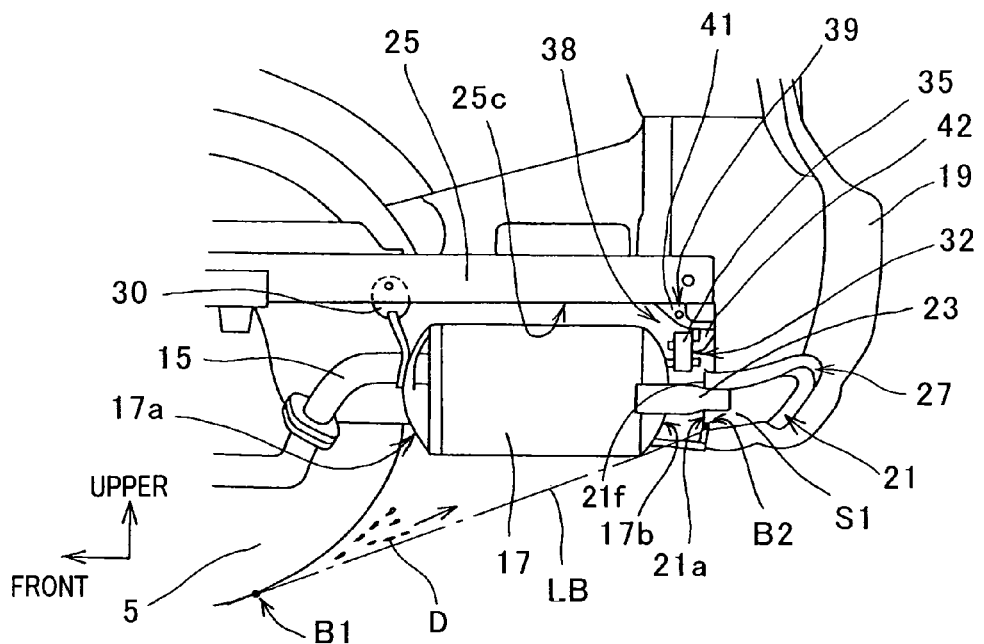
FIG. 1 is a left side sectional view of a vehicle along a line I-I in FIG. 5 and showing an embodiment of the present invention.
Figure 2:
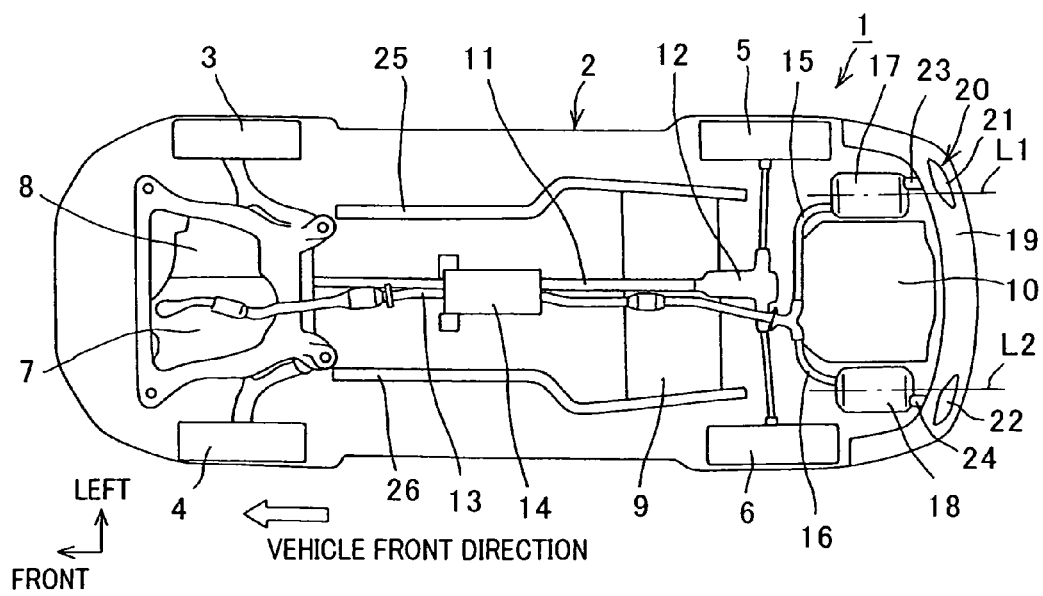
FIG. 2 is a bottom view of the vehicle.

FIGS. 1 to 5 show embodiments of the invention. In FIG. 2, a vehicle includes a vehicle body 2.

The vehicle 1 is provided with, as shown in FIG. 2, left and right front wheels 3, 4 at its front portion and left and right rear wheels 5, 6 at its rear portion.

In an engine room (not shown) between the left and right front wheels 3, 4 of the vehicle 1, an engine 7 and a transmission 8 are mounted transversely.

The vehicle 1 is mounted with a fuel tank 9 on a front side of a space between the left and right rear wheels 5, 6 and formed with a spare tire housing 10 on a rear side of the space between the left and right rear wheels 5, 6.

At this time, one end of a propeller or drive shaft 11 is connected to a side on which the engine 7 and the transmission 8 are mounted between the front wheels 3, 4 of the vehicle 1. The other end of the propeller shaft 11 is connected to a rear differential 12 positioned between the rear wheels 5, 6.

One end of an exhaust pipe 13 communicates with the engine 7. The exhaust pipe 13 is disposed near and below the propeller shaft 11 to extend to the vicinity of the rear differential 12.

At this time, a sub-muffler 14 is interposed at a midpoint of the exhaust pipe 13, which is at the center of the vehicle 1.

Then, the exhaust pipe 13 is split, at a position where it passes the rear differential 12, into first and second inlet pipes 15, 16, which are first and second split exhaust pipes respectively, extending toward the left and right rear wheels 5, 6.

The first and second inlet pipes 15, 16 extend to the vicinities of the left and right rear wheels 5, 6 and pass the spare tire housing 10. The pipes 15, 16 are curved respectively rearward with respect to the vehicle.

At this time, main mufflers, e.g., left and right, first and second mufflers 17, 18 are disposed to the left and right of the spare tire housing 10. The first inlet pipe 15 is connected to the first muffler 17 from the front of the vehicle and the second inlet pipe 16 is connected to the second muffler 18 from the front of the vehicle.

A rear bumper 19 is disposed at a rear portion of the vehicle 1 and is formed with diffusers 20 under the rear bumper 19 as shown in FIGS. 1 to 5.

The diffusers 20 include first and second diffusers 21, 22 formed at left and right portions of a lower portion of the rear bumper 19.

First and second tail pipes 23, 24 extend rearward with respect to the vehicle from rear end faces 17b, 18b of the first and second mufflers 17, 18 and open in the first and second diffusers 21, 22.

In other words, in the vehicle 1, left and right, first and second two rear side members 25, 26 extend in a front-rear direction of the vehicle and the rear wheels 5, 6 are disposed outside the rear side members 25, 26 in a vehicle width direction. The rear bumper 19 is disposed behind the rear wheels 5, 6. Opening portions, e.g., left and right, first and second opening portions 27, 28 are formed at side portions in the vehicle width direction of the rear bumper 19. The cylindrical diffusers 20, e.g., the left and right, first and second diffusers 21, 22 extending into the rear bumper 19 are mounted in the first and second opening portions 27, 28.

The first and second mufflers 17, 18 are disposed at the rear portion of the vehicle 1 so that axes L1, L2 of the mufflers 17, 18 extend respectively in the front-rear direction of the vehicle. The first and second tail pipes 23, 24 connected to the rear end faces 17b, 18b of the first and second mufflers 17, 18 are inserted into the first and second diffusers 21, 22 with spaces S left between the tail pipes 23, 24 and the inner peripheries of the diffusers 21, 22 to form an exhaust device of the vehicle 1.

Figure 3:
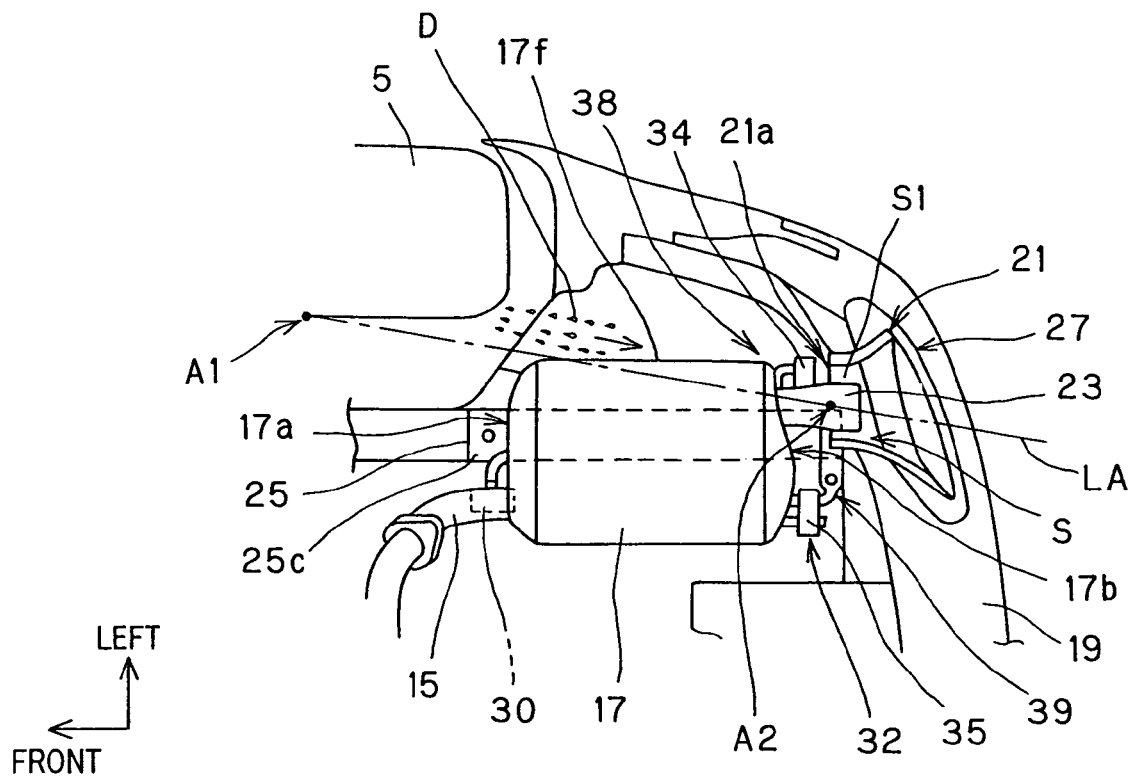
FIG. 3 is an enlarged bottom view of a left rear portion of the vehicle.
Figure 4:
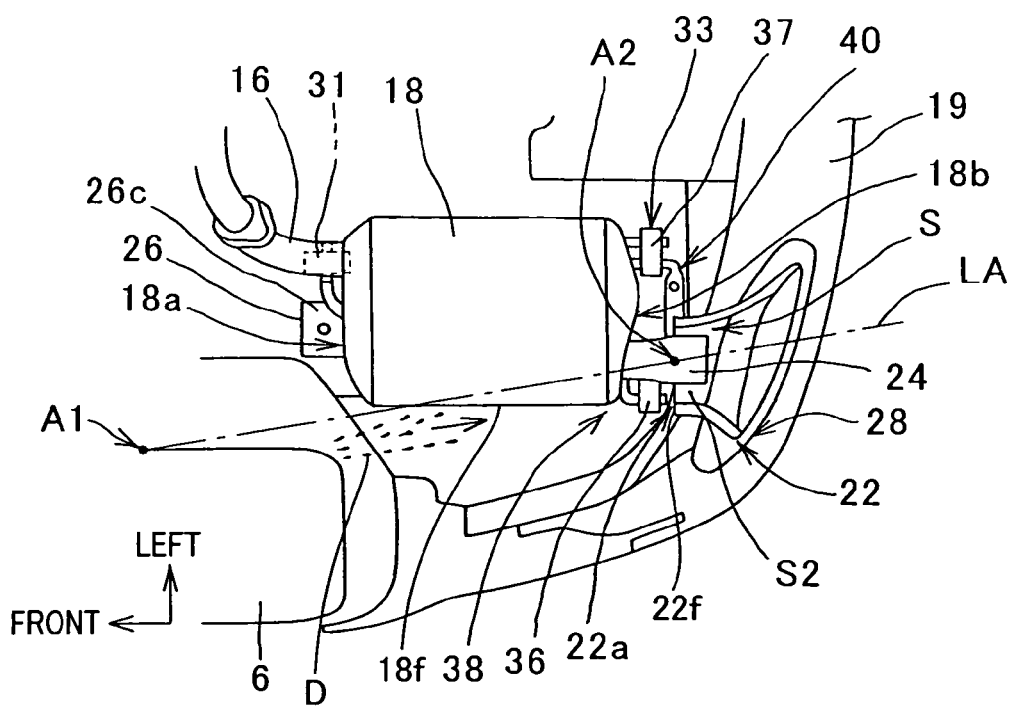
FIG. 4 is an enlarged bottom view of a right rear portion of the vehicle.

The spaces S appear respectively, in the left and right, first and second diffusers 21, 22 as shown in FIGS. 3 and 4 and include first and second spaces S1, S2.

At this time, the first and second mufflers 17, 18 are disposed at positions behind the rear wheels 5, 6 in the front-rear direction of the vehicle so that outer peripheral faces 17f, 18f of the first and second mufflers 17, 18 protrude outside the left and right, first and second rear side members 25, 26 in the vehicle width direction. The rear end faces 17b, 18b of the first and second mufflers 17, 18 face first and second front end opening portions 21a, 22a of the left and right, first and second diffusers 21, 22.

More specifically, for example, at a left rear portion of the vehicle 1, as shown in FIG. 1, when the left first diffuser 21 is mounted in the left first opening portion 27 formed at the side portion in the vehicle width direction of the rear bumper 19, the first tail pipe 23 is inserted into the first front end opening portion 21a of the first diffuser 21 while leaving the first space S1 and the rear end face 17b of the first muffler 17 disposed with its axis L1 extending in the front-rear direction of the vehicle faces the first front end opening portion 21a of the left first diffuser 21.

A right rear portion of the vehicle 1 has a symmetric structure to the above-described left rear portion and therefore will not be described.

FIG. 3 shows a contact point A1 of the left rear wheel 5 and a center point A2 of the first front end opening portion 21a of the left first diffuser 21. A line segment LA connecting the contact point A1 and the center point A2 is oriented in a horizontal direction in which dirt splashed by the left rear wheel 5 splashes.

An outer face of the first muffler 17 is positioned on the line segment LA to intercept the splashed dirt D.

In FIG. 1, if the contact point of the left rear wheel 5 is B1 and a lowest point of the first front end opening portion 21a of the left first diffuser 21 is B2, a line segment LB connecting the contact point B1 and the lowest point B2 is a vertical direction in which the dirt splashed by the left rear wheel 5 splashes.

A lower face of the first muffler 17 is positioned on the line segment LB to intercept the splashed dirt D.

Although the line segment LA and the line segment LB on only one of left and right sides have been described for convenience of disclosure of the drawings, the line segments LA and LB on the other side are symmetric to them with respect to the vehicle 1 and therefore will not be described.

In this way, because the mufflers as the main mufflers, e.g., the left and right, first and second mufflers 17, 18 are disposed on the rear sides of the rear wheels 5, 6 of the vehicle 1 in the vehicle front-rear direction so that their outer peripheral faces 17f, 18f protrude outside the left and right, first and second rear side members 25, 26 in the vehicle width direction. The dirt splashed by the rear wheels 5, 6 hits against the outer peripheral faces 17f, 18f, such as the outer faces and the lower faces of the first and second mufflers 17, 18 and falls, and thus is prevented from entering the first and second diffusers 21, 22.

Because rear end faces 17b, 18b of the first and second mufflers 17, 18 protruding outside the left and right, first and second rear side members 25, 26 in the vehicle width direction face the first and second front end opening portions 21a, 22a of the first and second diffusers 21, 22, it is possible to make the rear wheels 5, 6 and parts around them invisible from the first and second spaces S1, S2, which are the spaces S between the first and second front end opening portions 21a, 22a of the first and second diffusers 21, 22 and the rear end faces 17b, 18b of the first and second mufflers 17, 18 when the vehicle 1 is seen from behind, thereby improving the external appearance quality of the vehicle 1.

Figure 5:
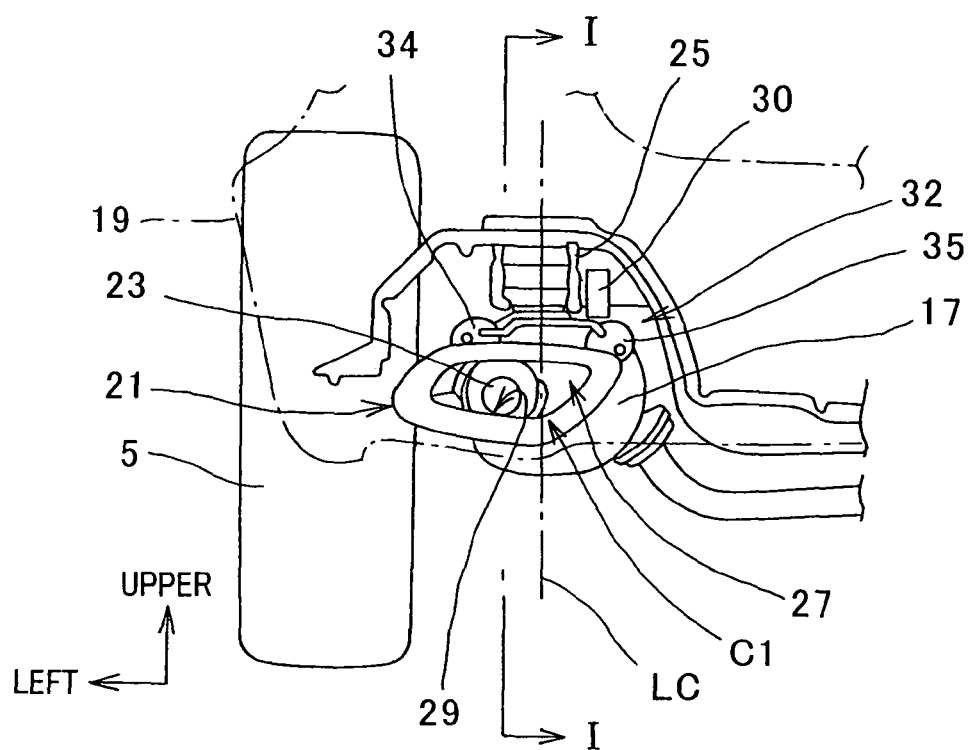
FIG. 5 is a schematic enlarged view of the left rear portion of the vehicle viewed from behind the vehicle.

When the vehicle 1 is seen from behind, as shown in FIG. 5, the muffler, e.g., the left first muffler 17 has a circular or oval sectional shape (oval in the embodiment) and a part of a lower face portion 29 of the first diffuser 21 outside the first rear side member 25 in the vehicle width direction is tilted to become higher in the vehicle vertical direction as it extends from the inside to the outside in the vehicle width direction.

In other words, when the vehicle 1 is seen from behind, as shown in FIG. 5, if a vertical line segment passing through a central portion of the first rear side member 25 is LC, the lower face portion 29 of the first diffuser 21 is tilted to become higher in the vehicle vertical direction as it extends from the inside to the outside in the vehicle width direction from a point C1 on the line segment LC.

At this time, as shown in FIG. 5, the lower face portion 29 of the first diffuser 21 is tilted to become higher in the vehicle vertical direction as it extends from the inside to the outside in the vehicle width direction from the point C1 on the line segment LC. The point C1 on the line segment LC is the lowest point of the lower face portion 29 of the first diffuser 21.

The second muffler 18 positioned on the right side of the vehicle 1 has a symmetric structure to the above-described left muffler and therefore will not be described.

As a result, if the mufflers as the main mufflers, e.g., the left and right, first and second mufflers 17, 18 have circular or oval sectional shapes, the lower faces of the first and second mufflers 17, 18 become higher as they extend outward in the vehicle width direction. Therefore, the dirt splashed by the rear wheels 5, 6 is less liable to pass below the first and second mufflers 17, 18, and reach the first and second diffusers 21, 22 on the outer sides in the vehicle width direction. Taking this factor into consideration, the portions of the lower face portions 29 of the first and second diffusers 21, 22 outside the first and second rear side members 25, 26 in the vehicle width direction, are tilted to become higher in the vehicle vertical direction as they extend from the inside to the outsides in the vehicle width direction. In this way, it is possible to prevent the dirt splashed by the rear wheels 5, 6 from entering the first and second diffusers 21, 22.

Moreover, it is possible to make the rear wheels 5, 6 and parts around them invisible from the first and second spaces S1, S2 as the spaces S between the first and second front end opening portions 21a, 22a of the first and second diffusers 21, 22 and the rear end faces 17b, 18b of the first and second mufflers 17, 18 when the vehicle 1 is seen from behind to thereby improve the external appearance quality of the vehicle.

As respectively shown in FIGS. 1, 3, and 4, in the mufflers as the main mufflers, e.g., the left and right, first and second mufflers 17, 18, the front end faces 17a, 18a of the first and second mufflers 17, 18 are respectively mounted on the first and second rear side members 25, 26 of the vehicle body 2 of the vehicle 1 with first and second front mount rubbers 30, 31 interposed therebetween.

The rear end faces 17b, 18b of the first and second mufflers 17, 18 are respectively mounted on the first and second rear side members 25, 26 with first and second rear mount rubbers 32, 33 interposed therebetween.

In other words, each of the first and second mufflers 17, 18 is provided with the one mount rubber on the front side and the two mount rubbers on the rear side (three in total).

The first rear mount rubbers 32 include a first rear outer mount rubber 34 at an outer position of the rear end face 17b of the first muffler 17 and a first rear inner mount rubber 35 at an inner position as shown in FIG. 3. The second rear mount rubbers 33 provided to the second muffler 18, include a second rear outer mount rubber 36 at an outer position of the rear end face 18b of the second muffler 18 and a second rear inner mount rubber 37 at an inner position as shown in FIG. 4.

The first and second rear mount rubbers 32, 33 for supporting the rear end faces 17b, 18b of the first and second mufflers 17, 18 on the vehicle body 2 of the vehicle 1 are disposed in spaces 38 sandwiched between the rear end faces 17b, 18b of the first and second mufflers 17, 18 and front end faces 21f, 22f of the first and second diffusers 21, 22 in the vehicle front-rear direction as respectively shown in FIGS. 1, 3, and 4.

The first and second rear mount rubbers 32, 33 are coupled to bottom faces 25c, 26c of the first and second rear side members 25, 26 with left and right, first and second brackets 39, 40 extending above the first and second diffusers 21, 22 interposed therebetween.

As shown in FIG. 1, the left first brackets 39, for example, out of the first and second brackets 39, 40 include a member-side bracket 41 mounted on the bottom face 25c of the first rear side member 25 and a mount-side bracket 42 connecting the member-side bracket 41 and the rear end face 17b of the first muffler 17 while retaining the first rear mount rubbers 32, i.e., the first rear outer mount rubber 34 and the first rear inner mount rubber 35.

The right second brackets 40 of the vehicle 1 have symmetric structures to the above-described left first brackets 39 and therefore will not be described.

This structure makes the rear end faces 17b, 18b of the first and second mufflers 17, 18 face the first and second front end opening portions 21a, 22a of the first and second diffusers 21, 22 in the vehicle vertical direction and reduces the first and second spaces S1, S2, which are the spaces S between the rear end faces 17b, 18b of the first and second mufflers 17, 18 and the first and second front end opening portions 21a, 22a of the first and second diffusers 21, 22 in the vehicle front-rear direction. As a result, the rear end faces 17b, 18b of the first and second mufflers 17, 18 cover the first and second front end opening portions 21a, 22a of the first and second diffusers 21, 22 to prevent the dirt splashed by the rear wheels 5, 6 from entering the first and second diffusers 21, 22.

I claim:

1. A vehicle exhaust device wherein rear wheels are disposed outside, in a vehicle width direction, rear side members extend in a vehicle front-rear direction, a rear bumper is disposed behind the rear wheels, the rear bumper having an opening portion formed at a side portion in the vehicle width direction, a cylindrical diffuser extending into the rear bumper is mounted in the opening portion, a muffler is disposed at a rear portion of a vehicle with an axis of the muffler extending in the vehicle front-rear direction, and a tail pipe connected to a rear end face of the muffler is inserted into the diffuser while spaced from an inner periphery of the diffuser,
    wherein the muffler is disposed on a rear side of the rear wheels in the vehicle front-rear direction with an outer peripheral face of the muffler protruding outside the rear side member in the vehicle-width direction,
    wherein the rear end face of the muffler faces a front end opening portion of the diffuser,
    wherein, when the vehicle is viewed from behind, the muffler has a circular or oval sectional shape, and
    wherein a portion of a lower face portion of the diffuser outside the rear side member in the vehicle width direction is tilted so as to become higher in a vehicle vertical direction as the portion extends from an inside to an outside in the vehicle-width direction in accordance with the shape of the lower surface portion of the muffler.

2. The vehicle exhaust device according to claim 1, wherein two mount rubbers for supporting a rear end portion of the muffler on a vehicle body are disposed in a space sandwiched between the rear end face of the muffler and a front end face of the diffuser in the vehicle front-rear direction, wherein the two mount rubbers are positioned on both sides of the rear side member in the vehicle-width direction, and the two mount rubbers are coupled to a bottom face of the rear side member with a bracket extending above the diffuser interposed therebetween.

3. The vehicle exhaust device according to claim 1, wherein the muffler is positioned to prevent dirt or mud lifted from a ground surface by rotation of the rear wheel from entering into the diffuser and to prevent a person located at the rear of the vehicle from viewing a ground surface through the diffuser.

4. The vehicle exhaust device according to claim 1, wherein the muffler comprises a first muffler and the device includes a second muffler, and wherein the diffuser comprises a first diffuser and the device includes a second diffuser.

* * * * *